Sept. 30, 1969　　　J. C. MORIN　　　3,469,459
DRIVE MECHANISM
Filed Feb. 26, 1968　　　3 Sheets-Sheet 2

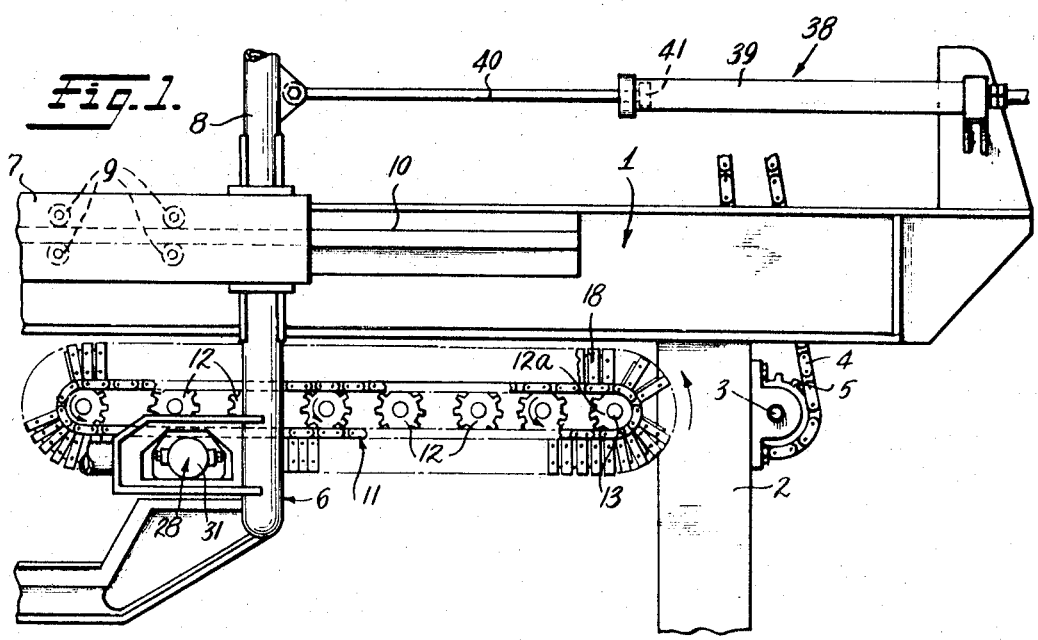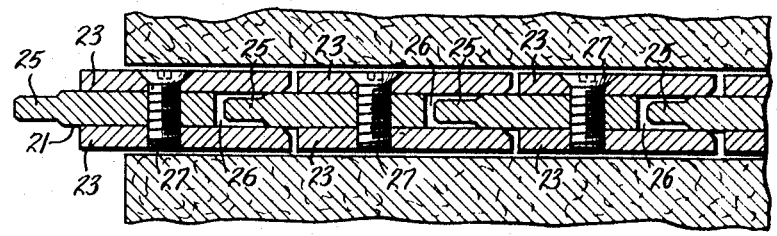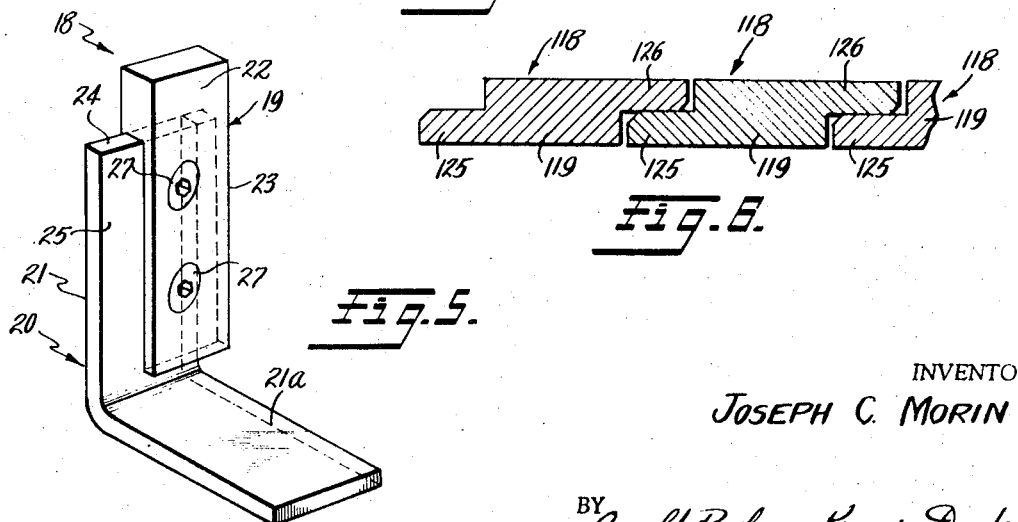

INVENTOR
JOSEPH C. MORIN

Sept. 30, 1969      J. C. MORIN      3,469,459
DRIVE MECHANISM
Filed Feb. 26, 1968      3 Sheets-Sheet 3
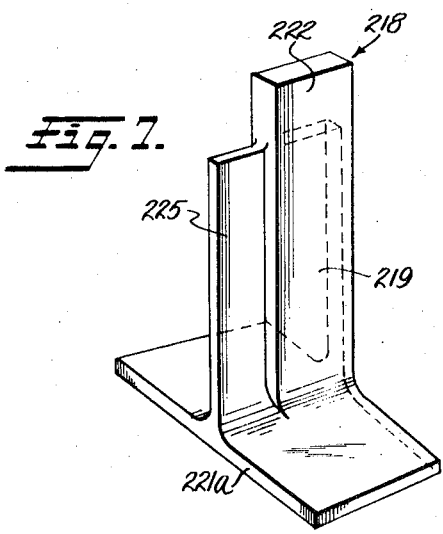
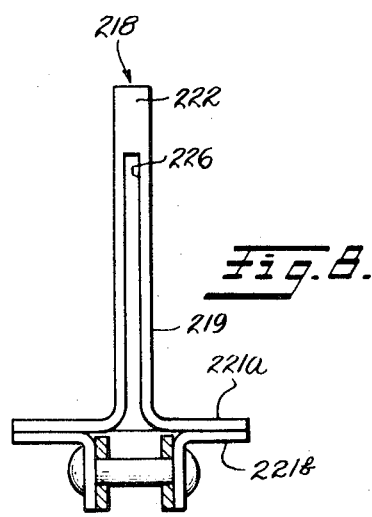
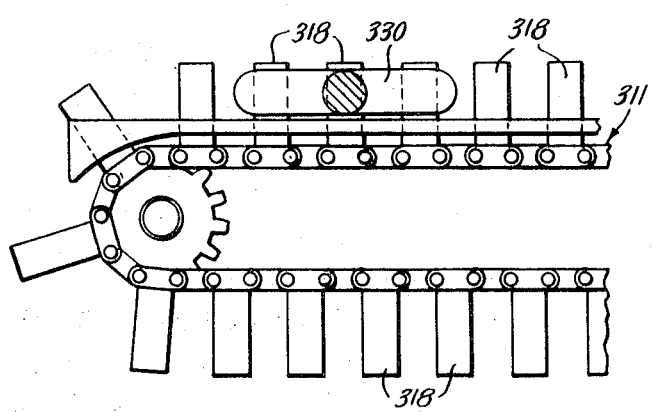
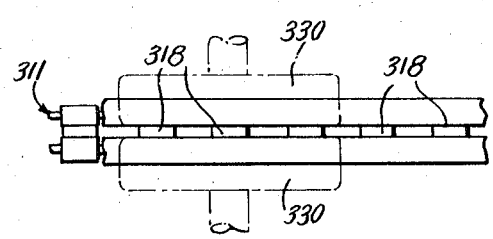
INVENTOR
JOSEPH C. MORIN
BY Arnold, Roylance, Kruger & Durkee
ATTORNEYS United States Patent Office 3,469,459
Patented Sept. 30, 1969

3,469,459
DRIVE MECHANISM
Joseph C. Morin, Edmonton, Alberta, Canada, assignor to Cupples Container Company, Austin, Tex., a corporation of Missouri
Filed Feb. 26, 1968, Ser. No. 708,381
Int. Cl. F16h *19/06;* F16d *25/00*
U.S. Cl. 74—37          12 Claims

ABSTRACT OF THE DISCLOSURE

A drive mechanism is provided for advancing a driven device, such as the mold carriage of a thermoforming machine, at an accurately predetermined constant speed. An endless flexible member, such as a drive chain, is equipped with a plurality of clutch elements which are disposed in a series lying in a single plane when traversing one portion of the closed path of travel of the endless member. A power operated clutch device, which can be secured to the device which is to be driven, is disposed so as to accomplish a clamping engagement with the clutch elements carried by the endless member.

---

This invention relates to drive mechanisms and particularly to drive mechanisms in which the driven device is advanced along a predetermined path at a constant rate and then returned to its starting point.

Drive mechanisms of the type described are employed, for example, in thermoforming machines to move the mold carriage forwardly through the molding zone at precisely the speed at which the sheet being thermoformed is fed through the machine. Typically, in such machines, the main power source is a rotary hydraulic or electric motor, and devices such as the mold carriage are driven from that motor by means of drive chains. The speeds of operation of such machines are relatively high. For example, the sheet to be thermoformed may be advanced at a speed of 15–50 feet per minute, and the length of travel of the mold carriage with the sheet may be on the order of 20–48", so that for each cycle of operation, the mold carriage must be connected to a drive chain, driven through 20–48", in the direction of travel of the sheet, disconnected from the drive chain, and returned to its starting point to commence a new cycle. The time allowed for such a cycle is on the order of 3–7 seconds.

In thermoforming machines and like apparatus, a particular problem is presented because various driven components of the machine must operate in precise synchronism over prolonged periods. Thus, the mold carriage of a thermoforming machine must not only move through its path of forward travel at precisely the same rate as the sheet to be thermoformed is travelling, but also be free of even minute operative "hesitations" which tend to arise, for example, from slippage in the drive mechanism employed. If the machine operates with a 5 sec. cycle, and is subject to a travel error on the order of 0.01" per cycle, for example, the cumulative error at the end of only 1 hr. of continuous operation can amount to more than 7", an error far too great to be tolerated.

Prior-art workers have proposed to use drive chains and various kinds of devices directly engaging the chain to couple the carriage or like driven device to the drive chain, but such devices have proved unsatisfactory because they do not provide an adequately positive action and are subject to extensive wear. Most important, prior-art devices have not been capable of such uniform driving action, over a period of prolonged continuous operation, that the operation of the carriage or other driven device can be kept in precise synchronism with other devices, such as the sheet feeding device in a thermoformer.

A general object of this invention is to provide a drive mechanism which will not only be free from the excessive wear which has characterized prior-art devices but will also be so precise in its operation as to enable the device which it drives to be kept in precise synchronism with other devices.

Another object is to devise a means by which an endless drive member, such as a chain, can be coupled to the driven device through a friction clutch.

A further object is to provide a drive mechanism for coupling an endless drive member to a device in such fashion that operation of the mechanism to engage and disengage is not dependent on the instantaneous position of any particular point on the endless drive member.

Yet another object is to provide an improved reciprocating drive mechanism capable of advancing a driven device, such as the mold carriage of a thermoformer, through a predetermined distance at an accurately predetermined constant speed, and then rapidly returing the driven device to its starting point.

Stated broadly, drive mechanisms according to the invention employ an endless flexible member, e.g., a roller chain, supported for movement in a closed path having a portion extending in a particular line of travel over which driving is to be accomplished, the endless member being equipped with a plurality of clutch elements which project therefrom in such fashion as to lie in a series extending at least substantially in a common plane when traversing said portion of the closed path. A power operated clutch device equipped with two opposed clutch members is so disposed that the two clutch members are located each on a different side of said portion of the closed path, so that the clutch device can be operated to move the clutch members simultaneously toward each other so that they come into clamping engagement with that portion of the series of clutch elements which is between the clutch members at the instant the clutch device is operated. In particularly advantageous embodiments of the invention, the clutch elements secured to the endless member are so constructed and dimensioned as to overlap each other as the elements pass through the critical portion of the closed path.

In order that the manner in which the foregoing and other objects are achieved in accordance with the invention can be understood in detail, particularly advantageous embodiments of the invention will be described with reference to the accompanying drawings, which form a part of this specification, and wherein:

FIG. 1 is a fragmentary side elevational view of a thermoforming apparatus equipped with a carriage drive mechanism in accordance with one embodiment of the invention;

FIG. 4 is a detail sectional view taken on line 4—4, FIG. 3;

FIG. 5 is a perspective view of a clutch element employed in the drive mechanism of the apparatus of FIG. 1;

FIG. 6 is a sectional view, similar to FIG. 4, illustrating another form of clutch element according to the invention;

FIG. 7 is a perspective view of yet another form of clutch element according to the invention;

FIG. 8 is an edge elevational view of the clutch element of FIG. 7;

FIG. 9 is a side elevational view of a potrion of a drive mechanism in accordance with a further embodiment of the invention; and FIG. 10 is a fragmentary plan elevational view of the mechanism of FIG. 9.

Figure 2:
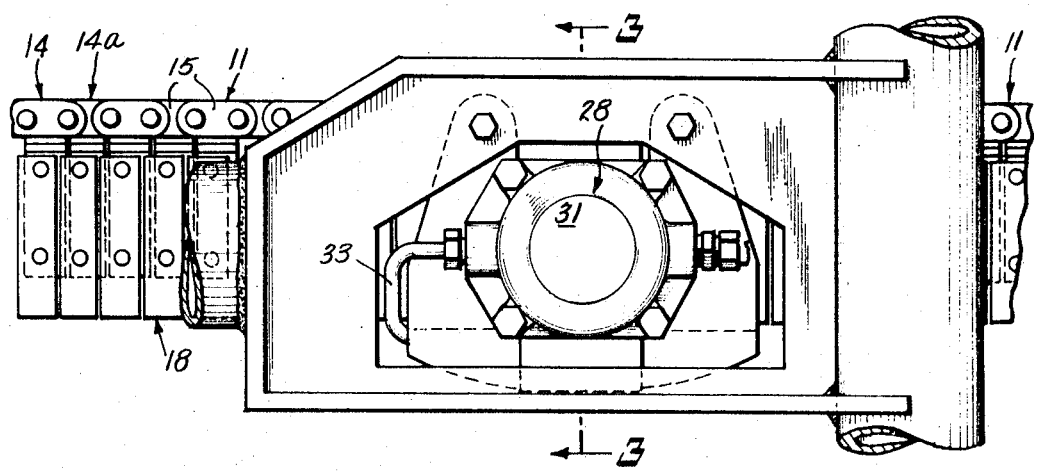
FIG. 2 is an enlarged fragmentary side elevational view of the apparatus of FIG. 1.

Turning now to the drawings in detail, FIGS. 1–5 illustrate a drive mechanism, according to one embodiment of the invention, incorporated as a carriage drive in a thermoforming apparatus of the type in which the carriage is advanced with the sheet, once the molds are in active position, the molds being returned to their starting point after traversing a molding zone. As seen in FIG. 1, the thermoforming apparatus comprises a frame including horizontal frame members 1 supported by uprights 2. The thermoplastic polymeric sheet to be thermoformed is conveyed continuously through the apparatus, from left to right as viewed in FIG. 1, by a constant speed sheet feeding apparatus (not shown) which is powered from a shaft 3 rotated continuously by a suitable drive motor (not shown) through drive chain 4 and sprocket 5.

A portion of the combined mold and trimmer carriage is illustrated at 6, FIG. 1, the carriage including horizontal side frame members 7 and upright side frame members 8. The carriage 6 is supported for rectilinear motion in the direction of travel of the thermoplastic sheet. Such support can be accomplished by providing side frame members 7 with a plurality of pairs of rollers 9 mounted for free rotation about horizontal axes, the rollers of each pair being spaced apart vertically so as to engage the top and bottom surfaces, respectively, of a horizontal rail 10 secured to main frame member 1.

The carriage drive mechanism comprises an endless flexible roller chain 11 supported by sprocket wheels 12, one of the sprocket wheels, indicated at 12a, being rotated continuously, its shaft 13 carrying a sprocket (not shown) driven by shaft 3 through a suitable drive chain. The roller chain 11 is thus driven continuously through a closed path including upper and lower straight horizontal portions. With the sprockets 12 turning in the direction indicated by the arrows in FIG 1, the lower straight run of the chain 11 is in the direction of travel of the polymeric sheet. The chain-and-sprocket mechanism interconnecting shafts 3 and 13 can be of any conventional type and is so constructed as to assure that the rate of travel of chain 11 through its lower straight run is constant and precisely equal to the rate of travel of the polymeric sheet through the machine.

Figure 3:
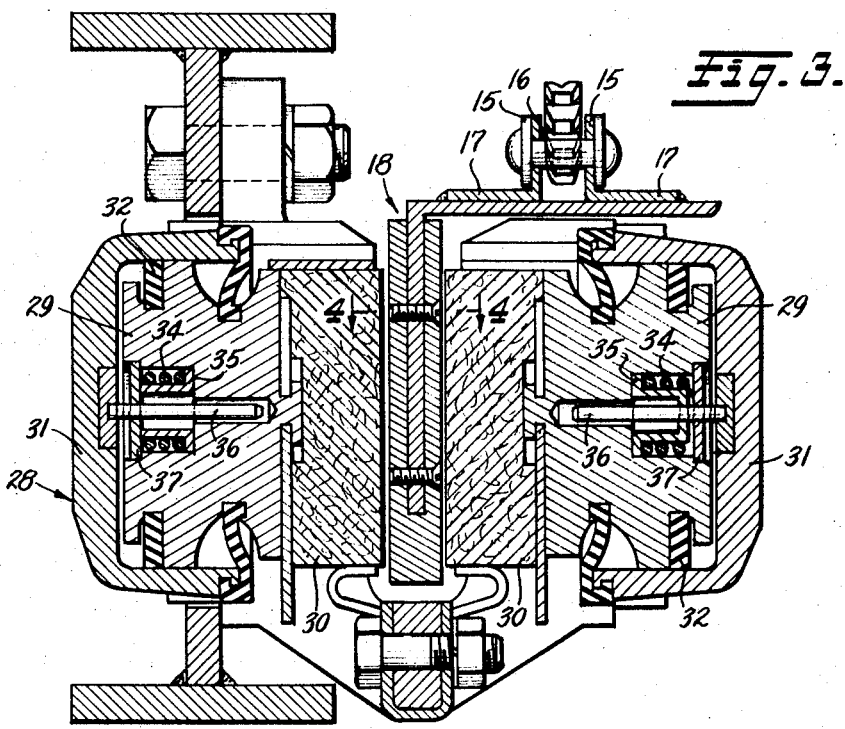
FIG. 3 is a detail sectional view taken on line 3—3, FIG. 2.

As seen in FIGS. 2 and 3, the roller chain 11 includes links 14 and 14a each comprising spaced parallel side plates 15, the side plates 15 of every link 14 being spaced apart by a distance slightly greater than the space between the side plates of links 14a, so that the end portions of the side plates 14a can overlap the inner surfaces of the end portions of the adjacent pair of links 14. The overlapped end portions of the side plates are interconnected pivotally by transverse roller pins 16. For each line 14, 14a of the chain 11, both side plates 15 are provided with an integrally formed laterally projecting ear 17, the two ears 17 of each link projecting in opposite directions and lying in a common plane parallel to the roller pins 16 of that link.

Chain 11 is equipped with a plurality of identical clutch elements indicated generally at 18, there being one of the elements 18 for each of the links 14, 14a. As seen in FIGS. 4 and 5, each clutch element 18 comprises a bifurcated member 19 and a supporting plate 20. Plate 20 includes a flat rectangular portion 21 and a flat portion 22 projecting at right angles to the plane of portion 21. Member 19 includes a solid tip 22 and two flat parallel legs 23 which are spaced apart by a distance just adequate to accommodate the thickness of portion 21 of plate 20. The flat side faces of tip 22 lie respectively in the flat plane defined by the outer face of the corresponding leg 23. Similarly, the flat edges of tip 22 lie respectively in a common flat plane with the corresponding edges of the two legs 23.

Portion 21 of plate 20 is disposed between legs 23 of member 19, with the free tip 24 of portion 21 in flush engagement with the inner edge of the tip 22 of member 19. Members 19 and 20 are of the same width, and portion 21 of member 20 is offset from member 19 so that, in effect, the two members are overlapped, an edge portion 25 of portion 21 of member 20 being exposed, and an equal part 26 of the space between legs 23 of member 19 being left open, as will be clear from FIG. 4. Members 19 and 20 are secured rigidly together by two screws 27.

As best seen in FIG. 3, portion 22 of member 20 is rigidly secured, as by welding, to the faces of ears 17 of one of the links 14, 14a which are directed away from the link. In the complete assembly, all of the clutch elements 18 are so arranged that (assuming the chain 11 to extend in a flat plane at right angles to shaft 13) the members 19 lie in a common plane parallel to the plane of the chain and spaced laterally therefrom.

Returning to FIG. 4, the dimensions of links 14, 14a and clutch elements 18 are such that, when any adjacent pair of the clutch elements 18 traverse either of the straight runs of the path of travel of the chain 11, the exposed edge portion 25 of member 20 of one such clutch element is engaged in the space 26 between legs 23 of member 19 of the other such clutch element. Thus, in effect, the adjacent clutch elements become interfitted, with the members 19 closely adjacent to each other and with the outer faces of the respective legs 23 of the clutch elements lying in common planes. On the other hand, the clutch elements 18 are free for movement relative to each other so that, as the chain links 14, 14a to which they are attached follow the end sprockets, the clutch elements can freely assume the necessary radial relationship with respect to the sprocket, as will be clear from FIG. 1.

The drive mechanism also includes a pneumatically operated clutch device indiacted generally at 28 in FIGS. 1–3. Device 28 can be of the type conventionally employed as a spot brake and includes two opposed clutch members 29, in the nature of pistons, each equipped with a circular block 30 of friction material. Each member 29 is slidably disposed in a cup-shaped cylinder body 31, an elastomeric ring 32 being provided to seal between member 29 and the inner wall of the cylinder body. Suitable conduiting 33, FIG. 2, is provided to supply air under pressure simultaneously to the interiors of both cylinder bodies 31, in the space between rings 32 and the end walls of the cylinder bodies, to actuate the two clutch members 29 toward each other, with the two clutch members moving simultaneously under the influence of equal driving forces. Control valves (not shown) are provided to control the supply of compressed air when the clutch members are to be actuated and to relieve the pressure within the cylinder bodies when the clutch members 29 are to be returned to their inactive positions. With the air pressure relieved, return of the members 29 can be effected by compression springs 34 each engaged between a stop member 35, which is fixed to the respective cylinder body 31 via a pin 36, and a washer 37 affixed to the member 29.

Clutch device 28 is secured to the carriage 6, as by being welded to the carriage frame, and is so located that the friction blocks 30 are located each on a different side of the path of travel of the clutch elements 18 as the clutch elements traverse the lower straight run of chain 11. The compression springs 34 bias clutch members 29 to positions such that friction blocks 30 are spaced apart by a distance slightly greater than the thickness of members 19. Hence, with clutch device 28 in its normal, unactuated condition, the clutch elements 18 can pass freely between the two friction blocks 30. When the clutch device is energized by supply of compressed air via conduiting 33, the resulting movement of members 29 toward each other causes the two friction blocks to engage those of elements 18 which are then present between the two friction blocks. Such engagement is simultaneous and under substantial pressure, so that the respective elements 18 are clamped between the friction blocks, establishing an essentially rigid interconnection between chain 11 and clutch device 28, and thus between the chain and the carriage. Since chain 11 is driven at precisely the same speed at which the polymeric sheet is being conveyed through the thermoformer, the carriage is advanced with the sheet at the same speed, so that there is essentially no relative movement between the carriage and the polymeric sheet so long as the friction blocks 30 remain clamped on the clutch elements 18.

The dimensions of the faces of friction blocks 30 are such that several, advantageously at least four, of the clutch elements 18 are simultaneously clamped between the friction blocks whenever clutch device 28 is actuated. The transfer of driving force from the chain to the carriage is thus accomplished over several adjacent links of the chain, assuring freedom from undesirable deflection of the chain.

The straight runs of chain 11 are at least as long as the length of travel to be imparted to the carriage. The chain being continuously driven, actuation of clutch device 28 results in continuous movement of the carriage throughout its intended length of travel. When such travel has been completed, the clutch device 28 is disengaged, so that the drive chain can continue its movement unimpeded, and the carriage stops. Return of the carriage to its initial position is achieved by a rectilinear pneumatic motor 38, which can simply comprise a pneumatic cylinder 39 secured to frame 1 and a piston rod 40 connected to the carriage. Cylinder 39 is suitably vented so as to allow free movement of the piston rod 40 and piston 41 relative to the cylinder as the carriage is advanced by chain 11. Supply of air under pressure to cylinder 39, after disengagement of clutch device 28, forces piston 41 to the left, as viewed in FIG. 1, and thus causes the desired return motion of the carriage, this occurring at a speed substantially greater than the rate of feed of the polymeric sheet.

FIG. 6 illustrates a modified form of clutch element which can be substituted for the elements 18 of FIGS. 1–5. Here, the clutch elements 118 are integral and comprise generaly flat rectangular bodies including a relatively thick intermediate portion 119, and thinner edge portions 125 and 126. Portions 125 and 126 are offset from each other in the direction of the thickness of intermediate portion 119, in such fashion that one face of portion 125 lies in the same plane as one of the side surfaces of portion 119, and the opposite face of portion 126 lies in the same plane as the other side surface of portion 119. Edge portions 125, 126 are of equal thickness, approximately one-half that of intermediate portion 119.

Elements 118 can be attached to the respective links 14, 14a of the drive chain in the same manner described with reference to elements 18, and are so dimensioned that, when traversing the straight portions of the closed path of travel of the chain, edge portion 125 of one element 18 overlaps edge portion 126 of the next adjacent element 118, as seen in FIG. 6. Hence, as they travel the straight portions of the closed path, the elements 118 arrange themselves in an overlapping series lying in a common plane and presenting, in effect, two continuously moving flat clutch faces.

FIGS. 7 and 8 illustrate another form of integral clutch element which can be used in place of elements 18 of FIGS 1–5 and is particularly useful when it is desirable to have the clutch elements lie in the same plane as the driving chain to which they are attached. Here, the clutch element 218 is in the form of an integral cast metal body including a rectangular portion 219 having a flange 225 projecting from one long edge thereof, the flange 225 being thinner than portion 219 and stopping short of the free tip 222 of that portion. A transverse mounting flange 221a extends at right angles across the end of portion 219 opposite tip 222 in such fashion as to project away from both side surfaces of portion 219. Flange 221a is secured, as by welding, to the ears 221b of the chain link to which the element 218 is attached, as seen in FIG. 8. At its edge opposite flange 225, the portion 219 is provided with a rectangular recess 226, FIG. 8, dimensioned to slidably accommodate the flange 225 of the next adjacent element 218 in the same general fashion hereinbefore described with reference to FIG. 4.

In the embodiments thus far described, the clutch elements carried by the roller chain are so constructed and arranged as to assume partially overlapping relationship when traversing the straight portions of the closed path of travel of the chain. FIGS. 9 and 10 illustrate an embodiment of the invention wherein such overlapping relationship is not employed. In this embodiment, the clutch elements 318 are integral flat rectangular metal bodies of uniform thickness, one element 318 being connected to every other link of the roller chain 311, as by means of a mounting flange as described with reference to FIG. 8. Elements 318 are thus spaced apart, rather than mutually overlapping, while traversing the straight portions of the closed path of travel of the chain. To assure that the elements 318 will track each other so as to lie in a common plane while passing through the straight portion of the path, two guide bars 320 are provided, the guide bars being parallel to the straight run of chain 311 and spaced apart transversely of the chain, the plane of the chain passing between the guide bars. A power operated clutch device similar to device 28 of FIGS. 1–3 is used, but is modified to include friction elements 330 which are adequately enlarged, in the direction of travel of the clutch elements 318, to assure that several of the spaced elements 318 will be clamped between the friction elements 330 whenever the clutch device is actuated.

While particularly advantageous embodiments of the invention have been shown and described for illustrative purposes, it will be clear to those skilled in the art that various changes and modifications can be made therein without departing from the scope of the invention as defined in the appended claims.

What is claimed is:

1. In a drive mechanism, the combination of
   an endless flexible member;
   means supporting said flexible member for movement in a closed path having a portion extending along a particular line of travel over which driving is to be accomplished;
   a plurality of clutch elements secured to said endless flexible member and projecting therefrom in such fashion as to lie in a series extending at least substantially in a common plane when traversing said portion of said closed path;
   a power actuated clutch device comprising
      two clutch members supported for movement toward and away from each other, each of said clutch members having a clutch face and said clutch faces being mutually opposed, and
      power means for actuating said clutch members; and
   means movably supporting said power actuated clutch device with said clutch members disposed each on a different side of said portion of said closed path,
      operation of said power means to move said clutch members toward each other being effective to bring said clutch faces into clamping engagement with the portion of said series of said clutch elements disposed between said clutch faces at the time of operation of said power means.

2. A drive mechanism according to claim 1, further comprising a power device connected to drive said endless flexible member through said closed path, said power actuated clutch device being constructed and arranged for mounting on a device to be driven by the drive mechanism.

3. A drive mechanism according to claim 1, wherein said clutch faces are dimensioned to engage more than one of said clutch elements at the same time.

4. A drive mechanism according to claim 1, wherein said endless flexible member is a chain, and said clutch elements are secured each to a different link of the chain.

5. A drive mechanism according to claim 4, wherein said closed path of said chain extends in a flat plane, and said common plane of said clutch elements is parallel to the plane of said chain.

6. A drive mechanism according to claim 4, wherein said common plane of said clutch elements is substantially coincident with the plane of said chain.

7. A drive mechanism according to claim 4, wherein said common plane of said clutch elements is spaced from the plane of said chain.

8. A drive mechanism according to claim 1, wherein adjacent ones of said clutch elements include edge portions of reduced thickness, one such edge portion of one of said clutch elements overlapping a corresponding such edge portion of the next adjacent one of said clutch elements when said clutch elements traverse said portion of said closed path.

9. A drive mechanism according to claim 8, wherein each of said clutch elements has a body portion of a predetermined thickness, a first flat edge portion projecting from one edge of said body portion, said first edge portion having a thickness substantially less than that of said body portion and being centered with respect to the thickness of said body portion, and a pair of edge flanges projecting in mutually parallel relation from the other edge of said body portion, the outer side faces of said edge flanges constituting continuations of the side faces of said body portion, the space between said edge flanges of each of said clutch elements being adequate to accommodate said first edge portion of the next adjacent one of said clutch elements.

10. A drive mechanism according to claim 1, wherein each of said clutch elements comprises an integral metal body having an intermediate portion and opposite edge portions, one of said edge portions comprising two parallel flanges spaced apart in the direction of the thickness of said metal body, the other of said edge portions being a flat portion of a thickness to be snugly accommodated between said flanges of the next adjacent one of said clutch elements, the outer surfaces of said intermediate portion of said flanges lying in respectively common planes.

11. A drive mechanism according to claim 10, wherein said integral body includes a base flange extending at right angles to said common planes for attachment to said endless flexible member.

12. A drive mechanism according to claim 1, wherein each of said clutch elements comprises a rectangular flat plate, and a bifurcated member having flat mutually parallel leg portions, said plate being disposed between said legs of said bifurcated member and having one of its edges spaced inwardly from the adjacent edges of said legs and its opposite edge portion projecting outwardly beyond the other edges of said legs, said clutch elements being so arranged relative to said endless flexible member that, for each adjacent pair of said clutch elements, said opposite edge of said plate of one element of the pair projects into the space between said legs of the other element of the pair adjacent said one edge of said plate of said other element.

References Cited
UNITED STATES PATENTS

| | | | |
|---|---|---|---|
| 916,857 | 3/1909 | Gates | 74—37 |
| 1,977,188 | 10/1934 | Kunz | 74—37 |
| 2,368,892 | 2/1945 | Skoog | 74—37 |
| 3,207,236 | 9/1965 | Shriner et al. | 74—37 |
| 3,039,708 | 6/1962 | Chidgey et al. | 74—37 |

FRED C. MATTERN, Jr., Primary Examiner

W. S. RATLIFF, Jr., Assistant Examiner

U.S. Cl. X.R.

74—125.5